United States Patent
Kanayama et al.

(10) Patent No.: US 8,254,770 B2
(45) Date of Patent: Aug. 28, 2012

(54) LENS APPARATUS

(75) Inventors: Masaomi Kanayama, Saitama (JP);
Junichi Kasuya, Ageo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/950,562

(22) Filed: Nov. 19, 2010

(65) Prior Publication Data
US 2011/0158620 A1    Jun. 30, 2011

(30) Foreign Application Priority Data
Dec. 28, 2009    (JP) .................. 2009-298406

(51) Int. Cl.
G03B 17/00   (2006.01)
H04N 5/228   (2006.01)

(52) U.S. Cl. ..................... 396/55; 348/208.3
(58) Field of Classification Search ............... 396/55; 348/208.3
See application file for complete search history.

(56) References Cited

U.S. PATENT DOCUMENTS

| 6,148,150 | A  | * | 11/2000 | Yajima et al. | 396/55 |
| 7,546,027 | B2 | * | 6/2009  | Moriya | 396/55 |
| 7,840,126 | B2 | * | 11/2010 | Fushida et al. | 396/53 |
| 2006/0228097 | A1 | * | 10/2006 | Higurashi | 396/55 |
| 2008/0192123 | A1 | * | 8/2008 | Lindsay | 348/208.2 |
| 2008/0260369 | A1 | * | 10/2008 | Ibaraki | 396/55 |
| 2009/0059016 | A1 | * | 3/2009 | Moriya et al. | 348/208.1 |

FOREIGN PATENT DOCUMENTS

| JP | 2002-229089 A | 8/2002 |
| JP | 2003-005243 A | 1/2003 |
| JP | 2008-271287 A | 11/2008 |

\* cited by examiner

*Primary Examiner* — Rodney Fuller
(74) *Attorney, Agent, or Firm* — Rossi, Kimms & McDowell LLP

(57) ABSTRACT

A lens apparatus supported by a support member, includes a pan/tilt detection portion for determining whether or not a pan operation and a tilt operation of the support member are performed, based on pan/tilt operation information output from the support member, an image blur correction lens for correcting an image blur, a vibration detection portion for detecting vibration of the lens apparatus, and calculating an amount of the image blur, and an image stabilizing portion for driving the image blur correction lens based on the amount of the image blur. The pan/tilt detection portion resets the vibration detection portion when the pan/tilt detection portion determines that one of the pan operation or the tilt operation is performed, and releases the reset of the vibration detection portion when the pan/tilt detection portion determines that the one of the pan operation or the tilt operation is not performed.

11 Claims, 4 Drawing Sheets

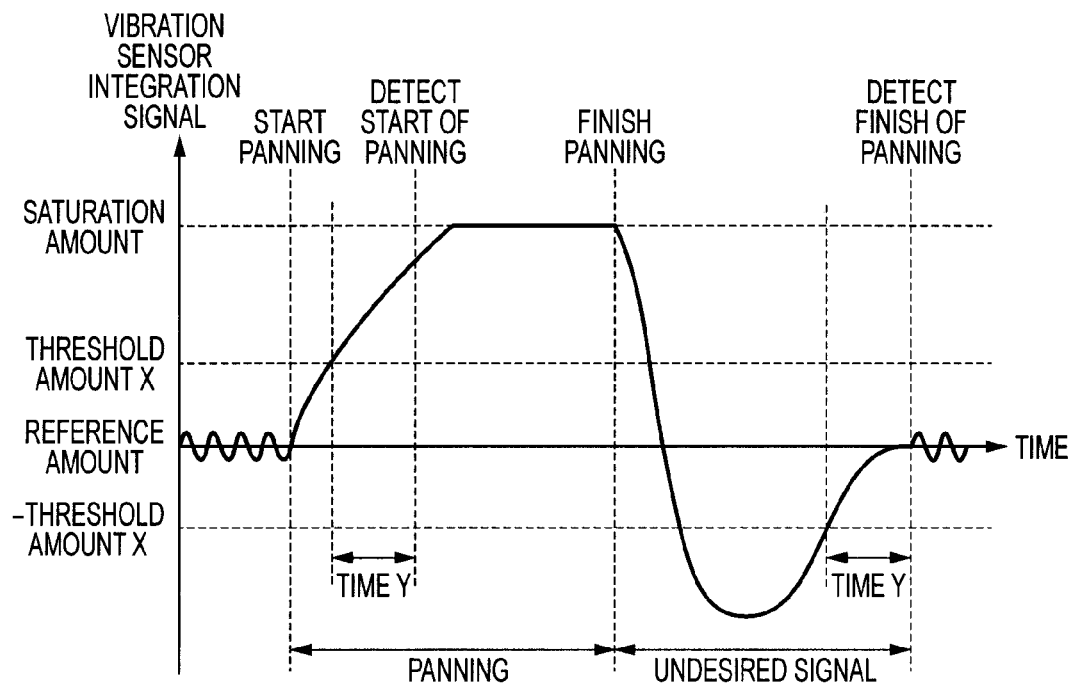
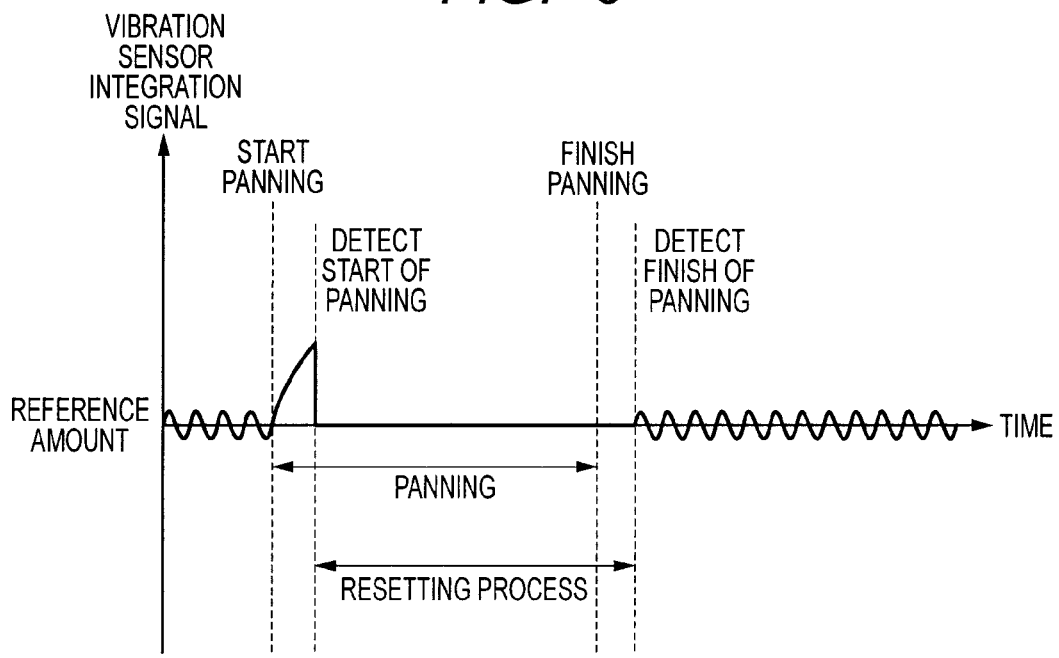

LENS APPARATUS

BACKGROUND OF THE INVENTION

1. Field of the Invention

The present invention relates to a lens apparatus having an image stabilization function.

2. Description of the Related Art

A conventional image stabilizing apparatus as disclosed in, for example, Japanese Patent Application Laid-Open No. 2002-229089, which is installed in a lens apparatus, detects vibration by using a vibration sensor to control a correction lens for decentering an optical axis according to the detected vibration. As the vibration sensor, an angular velocity sensor that mainly outputs an analog signal is used, and when vibration occurs, the angular velocity sensor detects an angular velocity and outputs signal according to the vibration. The output signal of the angular velocity is converted into a vibration angle signal by integration, and the vibration angle signal thus obtained is used for calculating a control amount of the correction lens. This control data is used for controlling a driving device such as a motor, to thereby correct an image blur.

Further, there is proposed such an operation that whether or not the lens apparatus is in a pan/tilt operation is automatically determined based on a vibration signal obtained from the vibration sensor, and when it is determined that the lens apparatus is in the pan/tilt operation, a mode of correction for an image blur is switched to an appropriate one. In an example of the proposed operation, when it is determined that the lens apparatus is in the pan/tilt operation, the correction for the image blur is stopped to prevent the image on the screen from becoming unnatural because of the correction for the image blur performed during the pan/tilt operation, and to improve operability of the pan/tilt operation. Whether or not the lens apparatus is in the pan/tilt operation is determined by, for example, detecting whether or not the intensity of the vibration signal obtained from the vibration sensor continues to exceed a predetermined threshold amount for a fixed period of time or longer.

In the case where the correction for the image blur is stopped as a result of the determination that the lens apparatus is in the pan/tilt operation, when it is then determined that the pan/tilt operation is finished, the correction for the image blur is resumed automatically. This operation is favorable because no manual operation is required to resume the correction for the image blur. In Japanese Patent Application Laid-Open No. 2002-229089, for example, when it is detected that the intensity of the vibration signal obtained from the vibration sensor remains below the predetermined threshold amount for the fixed period of time or longer, it is determined that the pan/tilt operation is finished, which triggers the resumption of the correction for the image blur.

In Japanese Patent Application Laid-Open No. 2003-005243, the pan/tilt operation causes a large increase in output from the vibration sensor, and accordingly the output after integration is saturated. After that, vibration cannot be detected. Therefore, when the output from the vibration sensor becomes equal to or larger than a predetermined amount (pan/tilt start determination), the calculation is reset to reduce the signal, and after the calculation is suspended until the vibration is attenuated (pan/tilt stop determination), the calculation of the vibration signal is performed again.

However, when the vibration sensor detects large vibration caused by the pan/tilt operation or the like, the vibration sensor outputs an undesired signal even when the vibration has stopped, and accordingly the output does not promptly return to a reference amount. The reference amount refers to a reference signal output when no vibration occurs. As described in Japanese Patent Application Laid-Open Nos. 2002-229089 and 2003-005243, as a result of using the vibration sensor to determine the stop of the pan/tilt operation, a delay occurs inevitably between the actual stop of the pan/tilt operation and the stop determined based on the output from the vibration sensor. Thus, there arises a problem that an image blur is not corrected for several seconds after an operator has finished the pan/tilt operation. The pan/tilt operation is performed in order to obtain an intended frame composition, and therefore it is a serious disadvantage that an image blur cannot be corrected at the moment that the intended frame composition is obtained. Further, a change in image attributed to the pan/tilt operation is also corrected until the start of the pan/tilt operation is detected, which leads to a problem that the image does not respond to the pan/tilt operation.

SUMMARY OF THE INVENTION

It is therefore an exemplary object of the present invention to provide, separately from a vibration sensor, a lens apparatus in which a pan/tilt operation is detected based on pan/tilt operation information output from a support member.

In order to achieve the above-mentioned object, the present invention provides a lens apparatus supported by a support member, including: a pan/tilt detection portion for determining whether or not a pan operation and a tilt operation of the support member are performed, based on pan/tilt operation information output from the support member; an image blur correction lens for correcting an image blur; a vibration detection portion for detecting vibration of the lens apparatus, and calculating an amount of the image blur; and a correction lens driving portion for driving the image blur correction lens based on the amount of the image blur, in which the pan/tilt detection portion resets the vibration detection portion when the pan/tilt detection portion determines that one of the pan operation and the tilt operation is performed, and releases the reset of the vibration detection portion when the pan/tilt detection portion determines that the one of the pan operation and the tilt operation is not performed.

Further features of the present invention will become apparent from the following description of exemplary embodiments with reference to the attached drawings.

According to the present invention, the pan/tilt operation is detected based on the operation information output from the support member such as a tripod that supports the lens, instead of the vibration sensor. As a result, the vibration detection portion can be reset during the pan/tilt operation, and after the stop of the pan/tilt operation, the correction for an image blur can be resumed promptly. Further, detection of the pan/tilt operation and detection of the vibration can be separated from each other, resulting in quicker detection of the pan/tilt operation and quicker response of the image at the start of the pan/tilt operation.

BRIEF DESCRIPTION OF THE DRAWINGS

FIG. 5 illustrates a component signal waveform of a vibration sensor, which is obtained through pan detection according to a conventional technology.

FIG. 6 illustrates a component signal waveform of the vibration sensor, which is obtained through pan detection according to the embodiment of the present invention.

DESCRIPTION OF THE EMBODIMENT

Hereinbelow, an exemplary embodiment of the present invention is described in detail with reference to the attached drawings.

Embodiment

Figure 1:
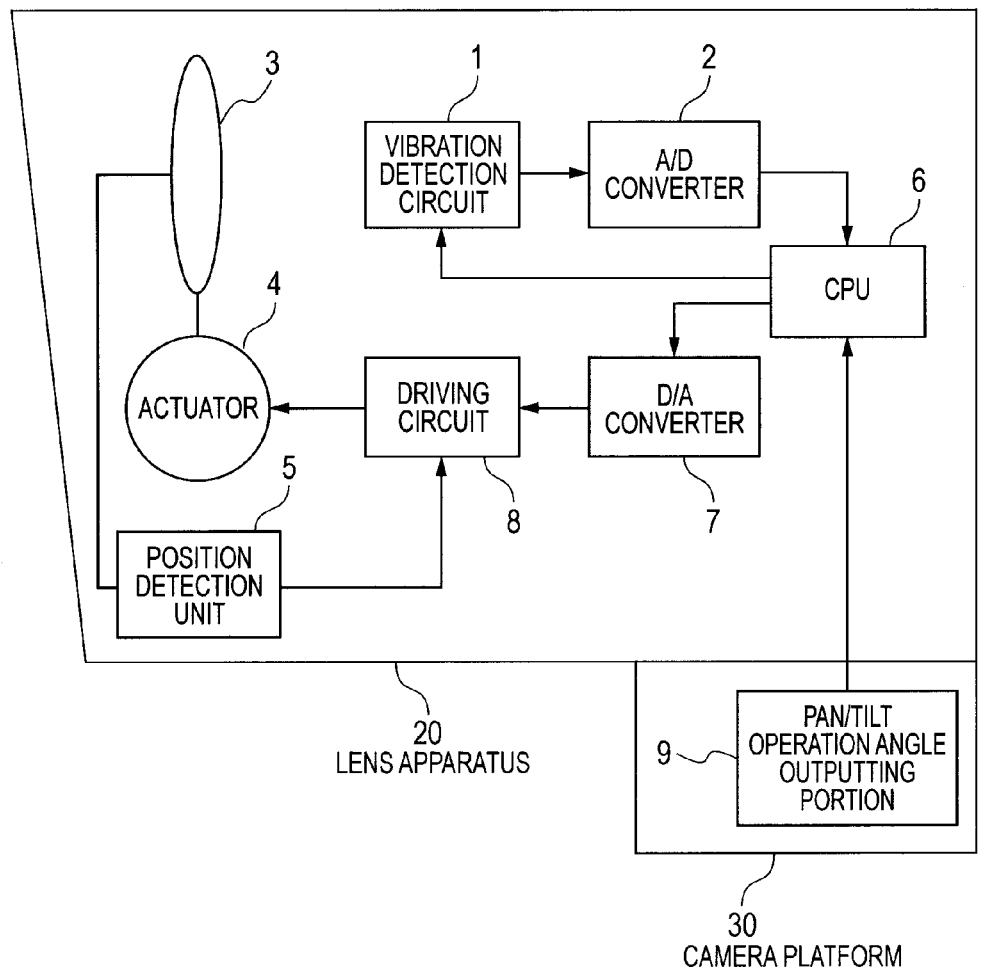
FIG. 1 is a schematic configuration diagram of a lens apparatus having an image stabilization function according to an embodiment of the present invention.

FIG. 1 is a configuration diagram illustrating a lens apparatus 20 according to the embodiment of the present invention. The lens apparatus 20 has an image stabilization function, and is attached to and supported by a camera platform (support member) 30 including an outputting portion for outputting a signal of a pan/tilt operation angle of the lens apparatus. The lens apparatus 20 includes a vibration detection circuit (vibration detection portion) 1 for detecting vibration of the lens apparatus 20, an ND converter 2 used for a CPU 6 to receive a signal output from the vibration detection circuit 1, an image blur correction lens 3 for correcting an image blur on an imaging plane by decentering an optical axis in a direction perpendicular to the optical axis, an actuator (correction lens driving portion) 4 for driving the image blur correction lens 3, and a position detection unit 5 for detecting a position of the image blur correction lens 3. The CPU 6 (e.g., pan/tilt detection portion) performs calculation of a control signal for the image blur correction lens 3 based on an output from the A/D converter 2, resetting control for the vibration detection circuit 1, and pan/tilt detection based on an output from a pan/tilt operation angle outputting portion. The lens apparatus also incudes a D/A converter 7 for converting the control signal for the image blur correction lens 3 calculated by the CPU 6 into an analog signal, a driving circuit 8 for driving the actuator 4, and a pan/tilt operation angle outputting portion 9 (pan/tilt detection portion) for detecting a pan/tilt operation angle of the camera platform 30, and outputting a value proportional to a pan/tilt operation amount in the form of a digital signal (pan/tilt operation information). In this embodiment, the pan/tilt operation angle outputting portion 9 outputs reference position data at the time of power-on, and then outputs data proportional to a position relative to the reference pan/tilt position at the time of power-on. The pan/tilt operation angle outputting portion 9 may be implemented by, for example, an incremental rotary encoder and a counter.

Figure 2:
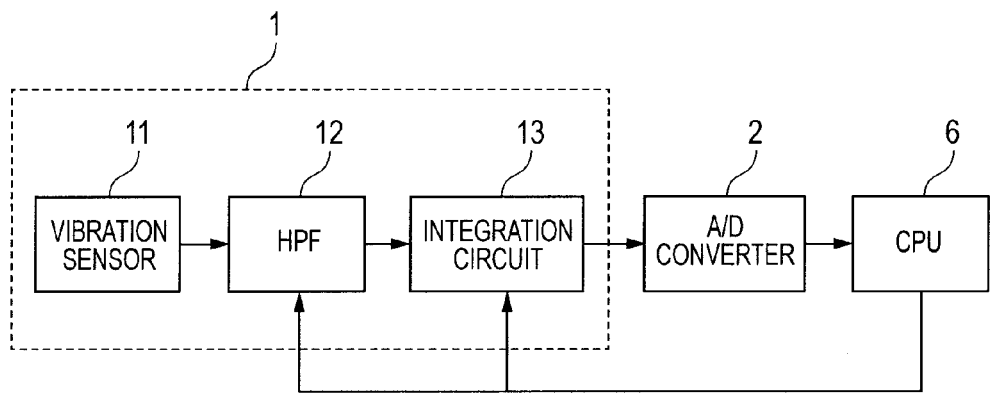
FIG. 2 is a schematic configuration diagram of a vibration detection circuit according to the embodiment of the present invention.

FIG. 2 is a block diagram of an exemplary configuration of the vibration detection circuit 1. Hereinbelow, operations of vibration detection and a resetting process are described with reference to the block diagram of FIG. 2.

An operation of the camera platform 30 includes two kinds of operation different in direction, namely, a horizontal pan operation (operation of moving an image taking area in a lateral direction) and a perpendicular (vertical) tilt operation (operation of moving an image taking area in a longitudinal direction). The pan operation refers to an operation of rotating the camera platform 30 in a lateral direction with respect to a direction in which the lens apparatus is oriented (in a case where the lens apparatus is installed so that the optical axis thereof becomes horizontal, a rotation operation in a horizontal plane). On the other hand, the tilt operation refers to a rotation operation in a direction perpendicular to that of the pan operation, that is, an operation of rotating the camera platform 30 in a longitudinal direction with respect to the direction in which the lens apparatus is oriented (in a case where the lens apparatus is installed so that the optical axis thereof becomes horizontal, a rotation operation in a direction perpendicular to a perpendicular plane). Similarly, a driving direction of the image blur correction lens 3 includes two directions, namely, horizontal (lateral) and perpendicular (longitudinal) directions. For simple description, it is hereinafter assumed that the operation of the camera platform 30 is the pan operation while the driving direction of the image blur correction lens 3 is the horizontal direction. In FIG. 1, the vibration detection circuit 1, the A/D converter 2, the actuator 4, the position detection unit 5, the D/A converter 7, and the driving circuit 8 need to be prepared for correction of the two directions, that is, for the pan direction and for the tilt direction, in actuality, but the illustration and description of those units are herein directed only to the pan direction because there is no difference in control between the pan direction and the tilt direction.

The vibration detection circuit 1 includes a vibration sensor 11 for detecting vibration, a high-pass filter (HPF) 12 for eliminating a DC component and a low frequency noise component contained in a signal output from the vibration sensor 11, and passing only a high frequency component, and an integration circuit (integration portion) 13 for amplifying an output from the HPF 12 and performing an integration process on the signal output from the vibration sensor 11, which corresponds to an angular velocity, to thereby convert the signal into a signal corresponding to an angle. The vibration sensor 11 detects an angular velocity of vibration, and outputs a voltage according to an amount of the angular velocity. The integration circuit includes an operational amplifier, a resistor, and a capacitor, and operates under CPU control. The integration circuit is based on an integration constant determined from values of the resistor and the capacitor. The angle signal output from the integration circuit 13 is converted into a digital signal by the A/D converter 2, and the obtained digital signal is read by the CPU 6.

During the pan operation, a resetting process for the vibration detection circuit 1 is performed. The resetting process herein refers to a reset of the integration circuit 13 and the HPF 12, in which the capacitor of the integration circuit 13 is discharged to initialize an integration value, and a cut-off frequency of the HPF 12 is set to a high frequency range. In one example of the filter characteristics, the cut-off frequency of the HPF 12 is set to 1 kHz, and frequency components equal to or smaller than 1 kHz are cut off. In view of the frequency band of vibration targeted for general correction for an image blur (approximately 0.5 Hz to 30 Hz), this substantially corresponds to initialization performed through cut-off of all the detected vibration signals that cause an image blur. The resetting process is performed by the CPU 6 controlling an analog switch (not shown) mounted on each of the HPF 12 and the integration circuit 13, and changing a time constant. The resetting process employed herein may be any process that involves inhibiting (avoiding) the drive of the image blur correction lens 3 by the actuator (drive of the correction lens based on a detection result from the vibration detection circuit), when the pan/tilt detection portion determines that the lens apparatus is in the pan operation or the tilt operation. The above-mentioned resetting process for the vibration detection circuit (resetting process for the signal detected by the vibration detection circuit) is one example thereof. As another example of the resetting process, there may be employed such a process that the CPU 6 ignores or disregards the signal output from the vibration detection circuit 1 (reduces an amplitude of the signal to a large extent), or that, in response to an instruction from the CPU 6, the A/D converter 2 converts the signal through A/D conversion and disregards the signal to a large extent. In an opposite case, that is, in a case where the pan/tilt detection portion determines that the lens apparatus is neither in the pan operation nor in the tilt operation, the CPU (control portion) 6 does not execute the resetting process. In other words, in this case, the drive of the image blur correction lens 3 by the actuator 4 (driving circuit 8) is permitted (executed) based on the vibration (detection result) detected by the vibration detection circuit.

The resetting process for the vibration detection circuit 1 may be performed on one of the HPF 12 and the integration circuit 13.

Figure 3:
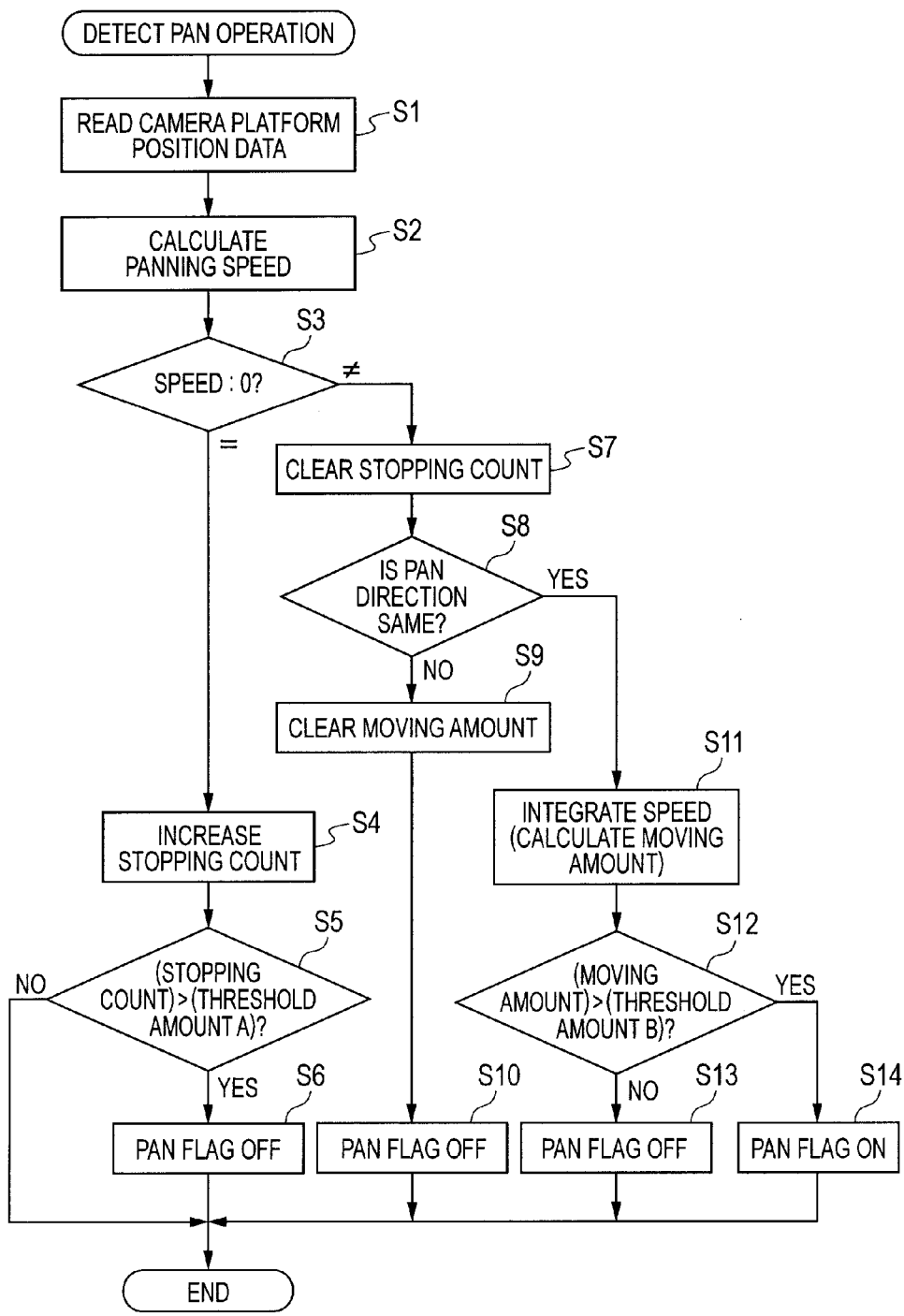
FIG. 3 is a flow chart of pan operation detection according to the embodiment of the present invention.

FIG. 3 is a flow chart illustrating a series of operations in pan detection using the output from the pan/tilt operation angle outputting portion 9 installed in the camera platform 30. Hereinbelow, the operations in the pan detection are described with reference to the flow chart of FIG. 3.

When a pan flag is OFF, it is determined that the lens apparatus is stationary on the camera platform with no pan operation, whereas when the pan flag is ON, it is determined that the lens apparatus is in the pan operation. The lens apparatus 20 is powered on via a camera (not shown). At the time of power-on, the pan flag is set to OFF. In Step S1, the CPU 6 receives data on a position of the camera platform from the pan/tilt operation angle outputting portion 9, and in Step S2, a pan operation speed is calculated based on a difference from a value obtained in previous sampling. When the pan operation speed is zero in Step S3, the processing proceeds to Step S4. In Step S4, a stopping count is increased, and when the value of the stopping count is equal to or larger than a threshold amount A in Step S5, the pan flag is turned OFF in Step S6. When the value of the stopping count is smaller than the threshold amount A, the pan flag is not changed. The threshold amount A is set to a value corresponding to the shortest period of time that allows the determination that the lens apparatus is not in the pan operation.

When the pan operation speed is not zero in Step S3, on the other hand, in Step S7, the stopping count is cleared, and in Step S8, it is determined whether or not the direction of the pan operation is the same as that in the previous sampling. When the direction of the pan operation is different, in Step S9, a moving amount of the pan operation is cleared, and in Step S10, the pan flag is turned OFF.

When the pan direction is the same in Step S8, on the other hand, the processing proceeds to Step S11, in which the pan operation speed is integrated, to thereby calculate the moving amount of the pan operation. When the moving amount of the pan operation is equal to or larger than a threshold amount B in Step S12, it is determined that the lens apparatus is in the pan operation, and in Step S14, the pan flag is turned ON. When the moving amount of the pan operation is smaller than the threshold amount B, on the other hand, in Step S13, the pan flag is turned OFF. The threshold amount B is set to the smallest pan operation angle change amount that allows the determination that the lens apparatus is in the pan operation. In this embodiment, whether or not the lens apparatus is in the pan operation is determined based only on the amplitude of the operation angle change amount of the pan operation, but a frequency of the operation angle change amount or both the amplitude and the frequency of the operation angle change amount may be used for the determination.

Figure 4:
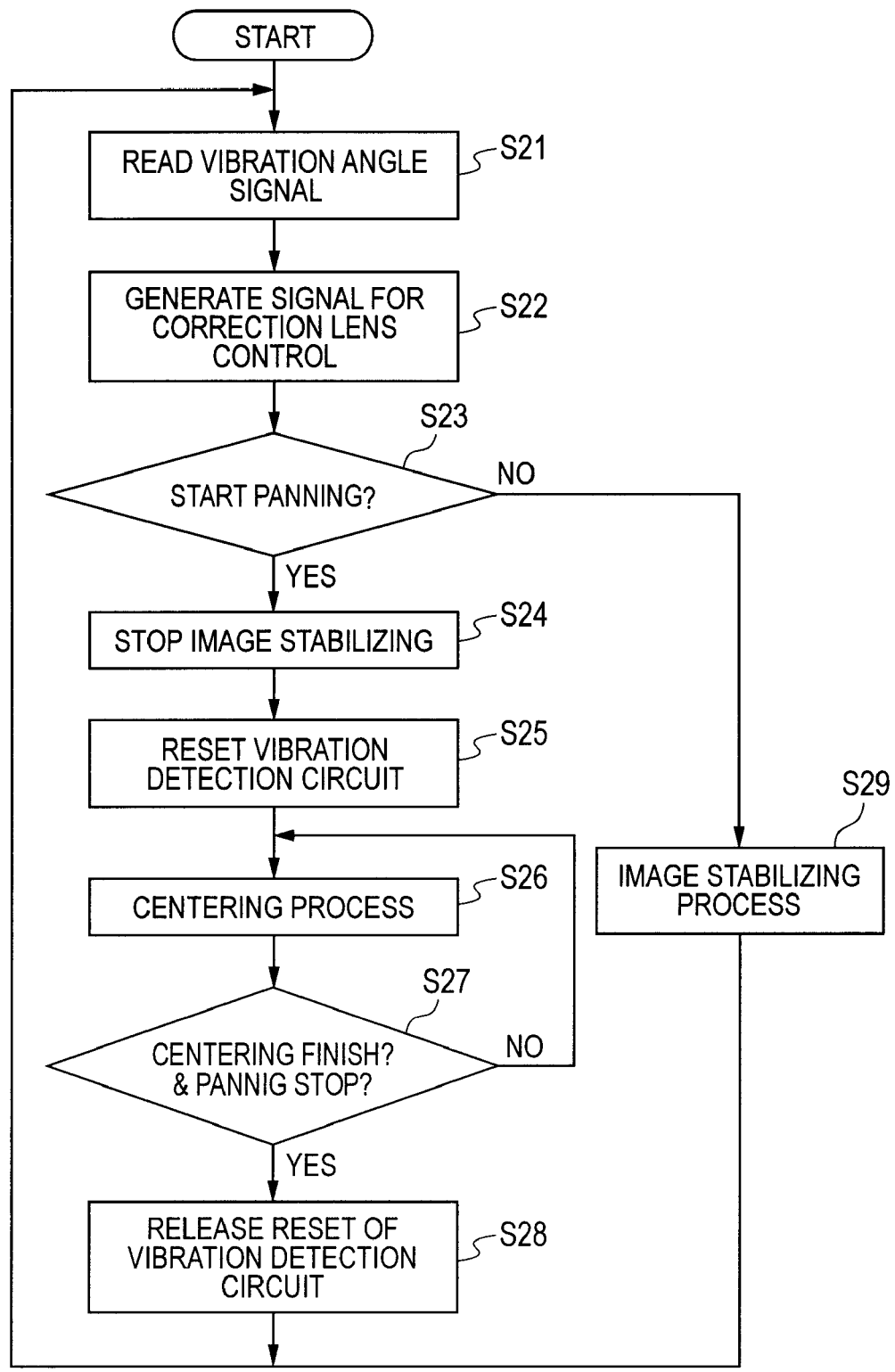
FIG. 4 is a flow chart of control on correction for an image blur according to the embodiment of the present invention.

FIG. 4 is a flow chart illustrating a series of operations in control on correction for an image blur. Hereinbelow, the operations in the correction for an image blur are described with reference to the flow chart of FIG. 4.

In Step S21, the CPU 6 receives a vibration angle signal output from the vibration detection circuit 1, and in Step S22, a signal for correction lens control is generated based on the vibration angle signal. In Step S23, it is determined whether or not the pan operation is performed, according to the flow of operations described in FIG. 3. When the pan operation is not performed, the processing proceeds to Step S29, in which the signal for correction lens control is output from the D/A converter 7 to the driving circuit 8, to thereby correct an image blur.

When it is determined in Step S23 that the pan operation is performed, in Step S24, the correction for an image blur is stopped, and in Step S25, the vibration detection circuit 1 is reset as described in FIG. 2. In Step S26, a centering process of in which the correction lens is gradually moved to a center position is performed. The centering process is continued until the correction lens returns to the center position. In Step S27, it is determined whether or not the pan operation is stopped, according to the flow of operations described in FIG. 3. When the pan operation is stopped, the processing proceeds to Step S28, and during the pan operation, the vibration detection circuit 1 is kept reset until the pan operation is stopped. In Step S28, the resetting process for the vibration detection circuit 1 is released, and the time constant of each of the HPF 12 and the integration circuit 13 is set back to a normal value. Then, the processing returns to Step S21, and the correction for an image blur is resumed. By resetting the vibration detection circuit 1 during the pan operation, no signal of the pan operation is detected, and accordingly, immediately after the stop of the pan operation, the correction for an image blur can be resumed.

FIG. 5 illustrates an integration signal waveform of the vibration sensor in the conventional control. FIG. 6 illustrates an integration signal waveform of the vibration sensor according to this embodiment. Hereinbelow, effects produced in this embodiment are described with reference to FIGS. 5 and 6.

FIG. 5 illustrates an example of determining the pan operation based on the output from the vibration sensor, which is to be used for correction for an image blur, as in the description of the related art. In the pan detection control of this example, when the intensity of an integration signal of the vibration sensor (difference from the reference amount) continues to exceed a threshold amount X for a time Y or longer, it is determined that the pan operation is performed, while when the intensity remains below the threshold amount X for the time Y or longer, it is determined that the pan operation is finished. The pan operation causes saturation of the integration signal corresponding to the vibration angle, and even when the panning is finished thereafter, an undesired signal component continues to be output because of continuous integration of an angular velocity signal during the pan operation, with the result that a delay occurs in detecting the finish of the panning. FIG. 6 illustrates pan detection control according to this embodiment, in which the pan operation is detected based on an operation angle signal from the camera platform 30. Because the resetting process is performed as long as the pan operation is detected, no undesired signal is output and accordingly a delay hardly occurs between the finish of the panning and the resumption of the correction for an image blur. Further, the start of panning can be detected more quickly than in the case of determination using the integration signal, resulting in a smaller correction amount of the image during the pan operation and quicker response.

This embodiment has described the case where the angular velocity signal obtained from the vibration sensor 11 is converted into a signal corresponding to an angle by using the HPF 12 and the integration circuit 13 configured by hardware, but the same effect can be obtained when the conversion calculation from an angular velocity into an angle may be implemented by software. Further, as the vibration sensor of this embodiment, an acceleration sensor such as an angular acceleration sensor or a linear acceleration sensor may be used instead of the angular velocity sensor. Further, the same effect can be obtained when the reset of the vibration detection circuit may be turned ON and OFF repeatedly during the pan operation. Further, in the centering process, the moving speed of the correction lens may be varied according to the pan operation speed obtained by the pan/tilt operation angle outputting portion 9.

The lens apparatus of this embodiment has been described in detail, but the present invention is not limited to the lens apparatus (lens apparatus detachable from an image pickup apparatus or an observation optical system of a telescope or binoculars). For example, the present invention is applicable to an image pickup apparatus (camera) including an image pickup element and the above-mentioned lens apparatus, in which the lens apparatus is used for guiding a beam for image taking from an object to the image pickup element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298406, filed Dec. 28, 2009, which is hereby incorporated by reference herein in its entirety.

What is claimed is:

1. A lens apparatus supported by a support member, the lens apparatus comprising:
    a pan/tilt detection portion configured to determine whether or not a pan operation and a tilt operation of the support member are performed based on pan/tilt operation information output from the support member;
    an image blur correction lens configured to correct an image blur;
    a vibration detection portion including a vibration sensor configured to detect vibration and an integration portion configured to perform an integration process on signal output from the vibration sensor; and
    a correction lens driving portion configured to drive the image blur correction lens based on the vibration detected by the vibration detection portion,
    wherein the pan/tilt detection portion inhibits the correction lens driving portion from driving the image blur correction lens and initializes an integration value of the integration portion when the pan/tilt detection portion determines that one of the pan operation or the tilt operation is performed, and permits the correction lens driving portion to drive the image blur correction lens when the pan/tilt detection portion determines that the one of the pan operation or the tilt operation is not performed.

2. A lens apparatus according to claim 1, wherein the reset of the vibration detection portion comprises an initialization of the detected vibration when the pan/tilt detection portion determines that a panning operation or a tilting operation is performed.

3. A lens apparatus according to claim 2, wherein:
    the vibration detection portion comprises:
        a high-pass filter configured to pass a high frequency component of a signal output from the vibration sensor before the integration portion performs the integration process on an output signal of the vibration sensor; and
    the initialization of the detected vibration is performed by setting a cut-off frequency of the high-pass filter in a high frequency range.

4. A lens apparatus according to claim 3, wherein the initialization of the detected vibration is performed by setting the cut-off frequency of the high-pass filter to 1 kHz.

5. A lens apparatus according to claim 3, wherein the signal output from the vibration sensor comprises one of an angular velocity or an angular acceleration of the vibration occurring in the lens apparatus.

6. A lens apparatus according to claim 1, wherein the pan/tilt operation information comprises an operation angle of the support member.

7. A lens apparatus according to claim 1, wherein the lens apparatus performs a centering process in which the image blur correction lens is returned to a reference position when the pan/tilt detection portion determines that the one of the pan operation or the tilt operation is performed.

8. A lens apparatus according to claim 1, wherein:
    a speed of each of the pan operation and the tilt operation is calculated based on the pan/tilt operation information output from the support member, and
    a moving speed of the image blur correction lens in the centering process is changed based on the speed of the each of the pan operation and the tilt operation.

9. An image pickup apparatus comprising:
    an image pickup element; and
    the lens apparatus according to claim 1, which guides a light beam from an object to the image pickup element.

10. A lens apparatus supported by a support member, the lens apparatus comprising:
    a pan/tilt detection portion configured to determine whether or not the support member is in a pan operation and a tilt operation, based on pan/tilt operation information output from the support member;
    an image blur correction lens for correcting an image blur;
    a vibration detection portion including a vibration sensor configured to detect vibration and an integration portion configured to perform an integration process on signal output from the vibration sensor;
    a correction lens driving portion configured to drive the image blur correction lens based on the vibration detected by the vibration detection portion; and
    a control portion configured to inhibit the correction lens driving portion from driving the image blur correction lens and initialize an integration value of the integration portion when the pan/tilt detection portion determines that the support member is in one of the pan operation or the tilt operation, and permit the correction lens driving portion to drive the image blur correction lens when the pan/tilt detection portion determines that the support member is not in the one of the pan operation or the tilt operation.

11. An image pickup apparatus comprising:
    an image pickup element; and
    the lens apparatus according to claim 10, which guides a light beam from an object to the image pickup element.

* * * * *